United States Patent
Lee et al.

(10) Patent No.: US 6,967,918 B2
(45) Date of Patent: Nov. 22, 2005

(54) OPTICAL RECORDING MEDIUM WITH WOBBLED HEADER AREA, AND DATA RECORDING METHOD AND APPARATUS THEREFOR

(75) Inventors: Kyung-geun Lee, Gyeonggi-do (KR); In-sik Park, Gyeonggi-do (KR); Jung-wan Ko, Gyeonggi-do (KR); Tae-kyung Kim, Seoul (KR); Jin-hoon Jeon, Gyeonggi-do (KR); Tatsuhiro Otsuka, Gyeonggi-do (KR); Du-seop Yoon, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 345 days.

(21) Appl. No.: 09/984,887

(22) Filed: Oct. 31, 2001

(65) Prior Publication Data

US 2002/0114251 A1 Aug. 22, 2002

(30) Foreign Application Priority Data

Dec. 26, 2000 (KR) .......................... 2000-82053
Jun. 14, 2001 (KR) .......................... 2001-33525

(51) Int. Cl.$^7$ .......................... G11B 7/0045; G11B 7/24
(52) U.S. Cl. .................. 369/59.25; 369/275.3
(58) Field of Search .......................... 369/53.2, 275.3, 369/275.4, 59.25, 116, 47.51, 53.24, 53.29, 44.13

(56) References Cited

U.S. PATENT DOCUMENTS

| | | | | | |
|---|---|---|---|---|---|
| 4,053,837 A | * | 10/1977 | Ryan et al. | ............... | 375/235 |
| 4,914,645 A | * | 4/1990 | Getreuer et al. | ......... | 369/44.26 |
| 5,848,050 A | * | 12/1998 | Nagasawa et al. | ....... | 369/275.4 |
| 6,058,099 A | * | 5/2000 | Senshu | ..................... | 369/275.3 |
| 6,128,273 A | * | 10/2000 | Horie et al. | ............. | 369/275.4 |
| 6,233,219 B1 | * | 5/2001 | Hori et al. | ............... | 369/275.4 |
| 6,269,071 B1 | * | 7/2001 | Van Den Enden et al. | ...... | 369/275.4 |
| 6,377,537 B1 | * | 4/2002 | Maeda et al. | ............ | 369/275.4 |

FOREIGN PATENT DOCUMENTS

| | | | |
|---|---|---|---|
| CN | 1208917 A | 2/1999 | |
| JP | 05314562 A | * 11/1993 | ........... G11B/11/10 |
| JP | 10-69646 | 3/1998 | |
| JP | 11-45441 | 2/1999 | |
| JP | 11-250462 | 9/1999 | |
| JP | 11-288518 | 10/1999 | |
| JP | 2000285460 | 10/2000 | |
| JP | 2002-190117 | 7/2002 | |
| JP | 2002-197678 | 7/2002 | |
| WO | WO98/54703 | 12/1998 | |

OTHER PUBLICATIONS

Translation of JP 05314562 A.*

* cited by examiner

*Primary Examiner*—Brian E. Miller
*Assistant Examiner*—Peter Vincent Agustin
(74) *Attorney, Agent, or Firm*—Stein, McEwen & Bui, LLP

(57) ABSTRACT

An optical recording medium with a wobbled header area and a data recording method and an apparatus therefore. The optical recording medium includes a wobbled track to which a wobble signal is recorded, and a wobbled header track to which a wobble header signal comprising header information and predetermined header marks are recorded. Accordingly, the physical geometry of a header area is uniform so that a decrease in the quantity of light reflected is prevented when data is recorded to the optical recording medium.

11 Claims, 13 Drawing Sheets

MIRROR

PITS

GROOVE

GROOVE WITH MARKS

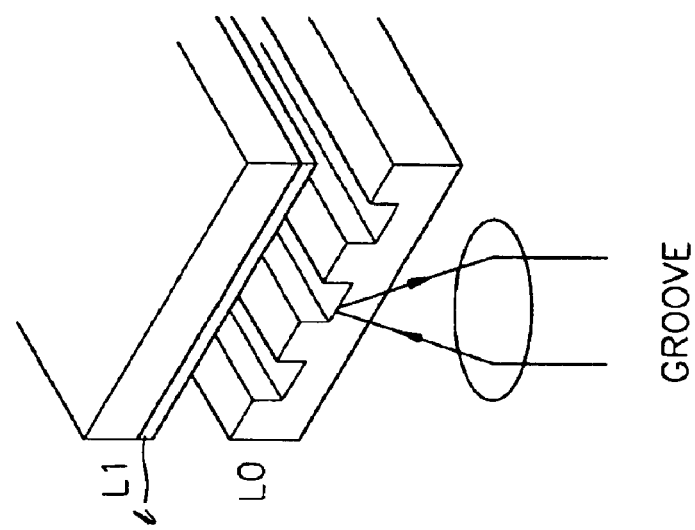
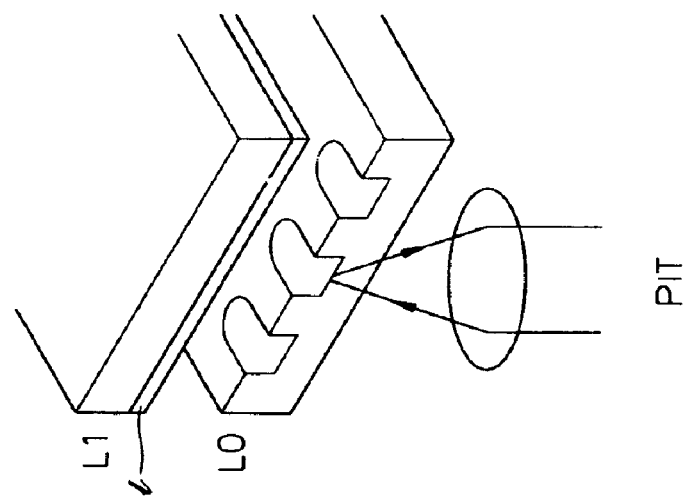
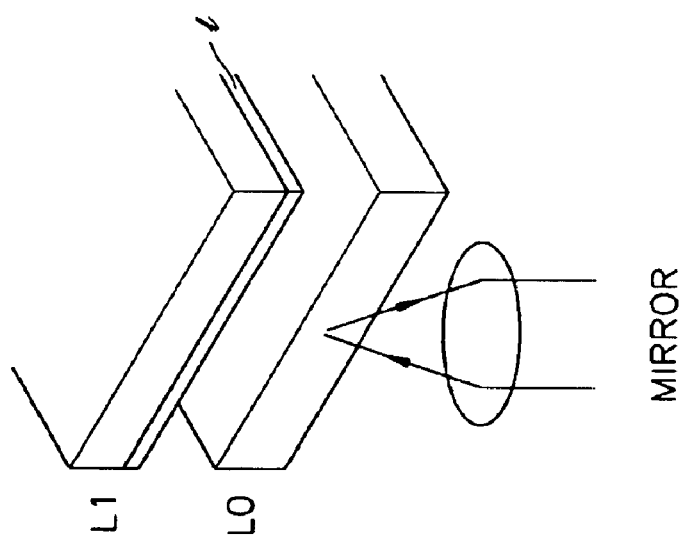

OPTICAL RECORDING MEDIUM WITH WOBBLED HEADER AREA, AND DATA RECORDING METHOD AND APPARATUS THEREFOR

CROSS-REFERENCE TO RELATED APPLICATIONS

This application claims the benefit of Korean Patent Application No. 2000-82053 filed on Dec. 26, 2000 and Korean Patent Application No. 2001-33525 filed on Jun. 14, 2001, in the Korean Industrial Property Office, the disclosures of which are incorporated herein by reference.

BACKGROUND OF THE INVENTION

1. Field of the Invention

The present invention relates to an optical recording medium, and more particularly, to an optical recording medium with a wobbled track to which a wobble signal containing user data is recorded, and a data recording method and apparatus therefore.

2. Description of the Related Art

An optical recording medium includes a header area to which header information is recorded and a user data area to which user data is recorded. In the case of a 2.65 GB or 4.7 GB DVD-RAM, each sector contains 128 bytes of header information. The header information is recorded in a form of pre-pits during the manufacturing of a disc substrate. According to DVD-RAM specifications, the header area having pre-pits formed during the manufacturing of a disc substrate includes a variable frequency oscillator (VFO) region for phase locked loop (PLL), a physical identification data (PID) region to which sector identification information (ID) is recorded, and an ID error detection (IED) region for storing error detection information. The header area in which pre-pits are formed is disposed at a predetermined portion of a sector. A pickup device provided in a recording/reproducing apparatus can easily find and move to a desirable location based on information recorded on the header area. The pickup device can recognize a sector number, sector type and a land or groove track and perform servo control based on the information recorded in the header area.

As the use of multi media rapidly spreads, a variety of methods for recording more information to an optical recording medium, such as a digital versatile disc (DVD), have been proposed. For example, there are methods of broadening a user data area to which user data can be recorded, including reducing the wavelength of a recording or reproducing laser and decreasing a track pitch.

FIG. 1 is a schematic diagram of a conventional optical disc. Referring to FIG. 1, land and groove tracks corresponding to a user data area to which user data is recorded are formed on the optical disc. Header areas 3 to which header information is recorded in a form of pre-pits are also disposed on the optical disc.

FIGS. 2A through 2D shows examples of a header area of a conventional optical disc. Referring to FIG. 2A, pre-pits for recording header information are formed in the middle the land and groove tracks. In other words, pre-pits are assigned to each track. In this structure, a track and pre-pits are formed on the same circumference so that a wobble signal and the header information can be recorded at the same time. However, if the density of the tracks is increased to improve the recording density, cross-talk may occur during the reproduction of the header information.

Referring to FIG. 2B, pre-pits are formed on a border between a land track and a groove track. In this structure, even if the density of the tracks is increased, cross-talk does not easily occur compared to the structure of FIG. 2A. In addition, a wider area for the pre-pits is provided, allowing the option of increasing the width of the pits. In other words, the structure of FIG. 2B is more preferable than that of FIG. 2A in terms of signal reproduction. However, since the pre-pits are formed on the border between the land track and the groove track, this structure is vulnerable to the tracking offset of a pickup device during recording or reproducing.

Referring to FIG. 2C, a group of pre-pits is formed on the middle of each land or groove track such that the group of pre-pits in one track is not adjacent to another group of pre-pits in an adjacent track. Accordingly, even if the density of the tracks is increased, a probability of cross-talk between the adjacent tracks is very low. However, since the pre-pits are formed on the middle of each track, this structure is insensitive to a tracking error. Therefore, it is difficult to perform smart servo control with the structure shown in FIG. 2C.

A structure shown in FIG. 2D is used in present DVD-RAMs. A group of pre-pits is formed on the border between a land track and a groove track such that the group of pre-pits in one track is not adjacent to another group of pre-pits in an adjacent track. Accordingly, cross-talk can be reduced and smart servo control can be achieved. However, it is difficult to position the pre-pits when the group of pre-pits in one track is not adjacent to another group of pre-pits in an adjacent track during the manufacture of a disc substrate. Accordingly, the signal characteristics of parts constituting a header area may not be in accord with each other.

In a conventional DVD-RAM, the proportion of a header area to a disc area is 0–5% per sector. To increase a user data area by minimizing such an overhead, a dual layer structure having two data recordable sides is used. However, in such a dual layer structure, recording power is influenced by the physical geometry of a lower layer when data is recorded to an upper layer.

To derive an improvement, effects of the physical geometry of a header area on a recording power in a dual layer structure were studied. More specifically, the quantity of light reflected from the structure such as a pit area and a groove area were calculated from simulations and compared to the measured values.

As shown in FIGS. 3A through 3D, the quantity of light reflected from a mirror substrate, a pit area, a groove area, and a groove area with marks was calculated during the simulations. A curvature of 30 μm was applied to a lens to account for the effect of a space layer between a lower layer and an upper layer in a dual layer structure. In addition, the number of tracks of the lower layer captured by laser beams passing through the lens was considered during the calculation.

To measure the quantity of reflected light, conditions as shown in FIGS. 4A through 4C were set. Here, "L0" denotes a lower layer, and "L1" denotes an upper layer. A reflective film 1 is formed below the upper layer L1. Laser beams are focused on a mirror area in FIG. 4A, on a pit area in FIG. 4B and on a groove area (with no marks) in FIG. 4C.

FIG. 5 is a graph showing the results obtained from FIGS. 3A through 4C. In calculating the quantity of light reflected, a track pitch was doubled to cover the structure as shown in FIG. 2A. For the groove area with marks, only the difference in reflectivity between a marked portion and a land or groove portion was considered. A difference in the transmittance of the marked portion due to a difference in absorptance between an amorphous state and a crystalline state was not considered.

Tables 1 and 2 show input parameters and their values for the experiments.

TABLE I

| Parameters | Values |
|---|---|
| Wavelength (nm) | 400 |
| Numerical aperture (NA) of an objective lens | 0.65 |
| Minimum mark length (μm) | 0.275 |
| Modulation | EFM+ |
| Track pitch (TP) (μm) | 0.30, 0.34, 0.38 |
| Reflectivity (%) | Rc = 28, Ra = 10 |

TABLE 2

| Items | Factors | Examples |
|---|---|---|
| Dual layer High NA | Transmittance of L0 | 60% |
| | Geometry of L0 | Groove, pit, . . . |
| | Number of tracks ranged over by a beam | NA 0.65:85 tracks NA 0.85:160 tracks |
| | Angle of an incident beam/Reduction of transmittance | NA 0.65:40.5° NA 0.85:58.2° |

According to the simulations, transmittance least decreased at the mirror substrate and decreased more at the pit area. Further decrease in transmittance was observed at the groove area. Depending on the track pitch, the transmittance decreased by 4–7.5% at the pit area while the transmittance decreased by 7.5–28.5% at the groove area.

In the measurements, the quantity of light reflected from the pit area was measured at a track pitch of 0.37 μm and decreased by 0–4%. In the case of the groove area, decrease in a measured value was less than the decrease calculated in the simulations. It is inferred that this phenomenon occurred because while a wall angle of 90° was assumed in the simulations, practical wall angle was 0–60°, so that the measured quantity of the light was 3% larger than the calculated value from the simulations.

As a track pitch decreases, the quantity of transmitted light decreases at the pit and groove areas. A measured value obtained at a track pitch of 0.34 μm (practically, 0.34 μm×2) was 0–4% smaller than a reference value obtained at a track pitch of 0.38 μm (practically, 0.38 μm×2). However, when a header area has a structure as shown in FIG. 2D, it is inferred that the quantity of transmitted light decreases less. A decrease in the quantity of transmitted light was 9.5% at a track pitch of 0.34 μm and 22% at a track pitch of 0.30 μm at the groove area. When a track pitch was 0.34 μm, a measured value was 7.5% smaller than a calculated value.

As a result, it can be inferred that the upper layer L1 needs at least 20% larger recording power than the lower layer L0 at the groove area when a track pitch is 0.30 μm and the NA of an objective lens is 0.85. In other words, a header area with pre-pits is not suitable for high density recording and influences recording power when data is recorded to the upper layer of a dual layer structure.

SUMMARY OF THE INVENTION

To solve the above-described problems, it is a first object of the present invention to provide an optical recording medium with a physical geometry which does not influence the recording power, and a data recording method and apparatus therefor.

It is a second object of the present invention to provide an optical recording medium for preventing degradation of a header area against repetitive recording, and a data recording method and apparatus therefor.

Additional objects and advantages of the invention will be set forth in part in the description which follows and, in part, will be obvious from the descriptions, or may be learned by practice of the invention.

To achieve the above and other objects of the present invention, there is provided an optical recording medium including a wobbled track to which a wobble signal is recorded, and a wobbled header track to which a wobble header signal comprising header information is recorded.

In another embodiment, there is provided an optical recording medium including a wobbled track to which a wobble signal is recorded, and a wobbled header track to which a wobble header signal comprising header information and predetermined header marks are recorded. Preferably, the header marks are recorded to a land or groove of the wobbled header track, and the header marks are recorded through a change in phase. More preferably, the header marks have a predetermined size and are arranged at regular intervals so that they act as synchronization data for the following wobbled track.

In both of the embodiments, the wobbled header track and the wobbled track are disposed to alternate with each other. The wobbled track is a user data area to which user data is recorded and includes a land track and/or a groove track. Preferably, the wobble signal has a single frequency, and the wobble header signal has a frequency which is higher than the frequency of the wobble signal and is obtained by modulating binary data containing the header information. More preferably, the modulation is done by quadrature phase shift keying (QPSK).

To achieve the above and other objects of the present invention, there is provided a method of recording data to a recording medium which includes a wobbled track to which a wobble signal is recorded, and a wobbled header track to which a wobble header signal comprising header information is recorded. The method includes recording user data to the wobbled track with a recording power and passing the wobbled header track with a passing power lower than the recording power by a predetermined level.

There is also provided a method of recording data to a recording medium which includes a wobbled track to which a wobble signal is recorded, and a wobbled header track to which a wobble header signal comprising header information and predetermined header marks are recorded. The method includes recording user data to the wobbled track with a recording power, determining whether the header marks have been formed, and recording the header marks to a land or groove of the wobbled header track with a predetermined power if the header marks have not been formed, otherwise passing the wobbled header track with a passing power lower than the recording power by a predetermined level.

Preferably, the recording of the header marks includes forming the header marks to at least part of the wobbled header track at regular intervals. More preferably, the recording of the header marks includes forming the header marks having a predetermined size to at least part of the wobbled header track at regular intervals.

In one embodiment, there is provided an apparatus of recording data to a recording medium which includes a wobbled track to which a wobble signal is recorded, and a wobbled header track to which a wobble header signal comprising header information is recorded. The apparatus includes a recording unit which records user data and detects and passes the wobbled header track, and a controller which controls the recording unit to record the user data to the wobbled track and pass the wobbled header track.

In another embodiment, there is also provided an apparatus of recording data to a recording medium which includes a wobbled track to which a wobble signal is recorded, and a wobbled header track to which a wobble header signal comprising header information and/or predetermined header marks are recorded. The apparatus includes a recording unit which records user data, and records the header marks if the header marks have not been formed, otherwise detects and passes the wobbled header track, and a controller which determines whether the header marks have been formed, and controls the recording unit to record the user data to the wobbled track and record the header marks to a land or groove of the wobbled header track, otherwise controls the recording unit to record the user data to the wobbled track and pass the wobbled header track. Preferably, the controller controls the recording unit to form the header marks to at least part of the wobbled header track at regular intervals.

Preferably, the recording unit includes a laser beam generator which generates a laser beam, an electro-optical modulator which modulates the laser beam generated from the laser beam generator into an optical signal, and an optical recorder which records the user data or header marks using the optical signal output from the electro-optical modulator. More preferably, the controller controls the recording unit to record the user data to the wobbled track with a recording power and pass the wobbled header track with a passing power lower than the recording power by a predetermined level.

BRIEF DESCRIPTION OF THE DRAWINGS

These and other objects and advantages of the present invention will become more apparent and more readily appreciated from the following description of the preferred embodiments, taken in conjunction with the accompany drawings in which:

FIGS. 4A through 4C are diagrams showing the measuring of a decrease in the quantity of reflected light;

DETAILED DESCRIPTION OF THE PREFERRED EMBODIMENTS

Figure 1:
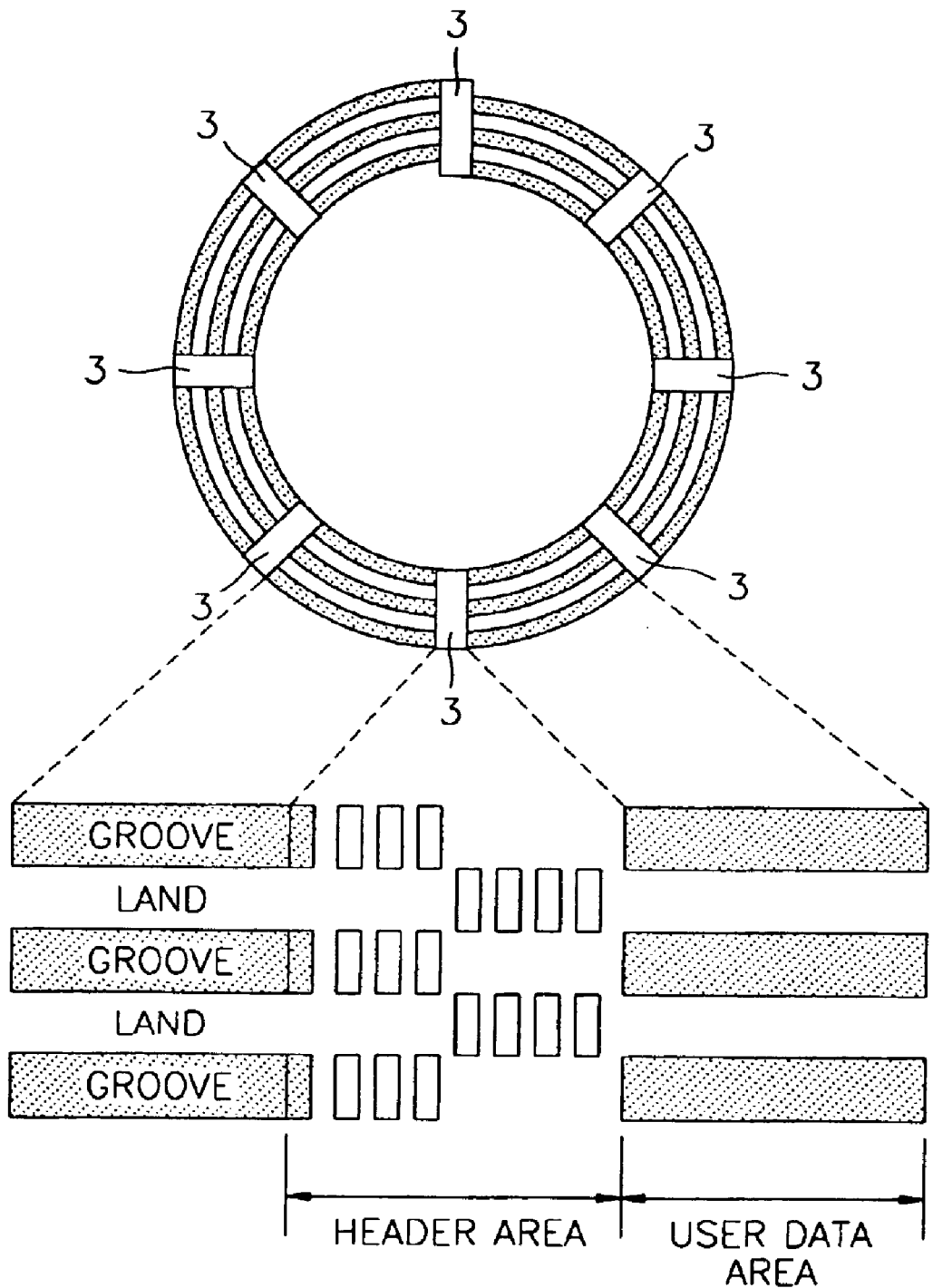
FIG. 1 is a schematic diagram of a conventional optical disc.
Figure 2A:
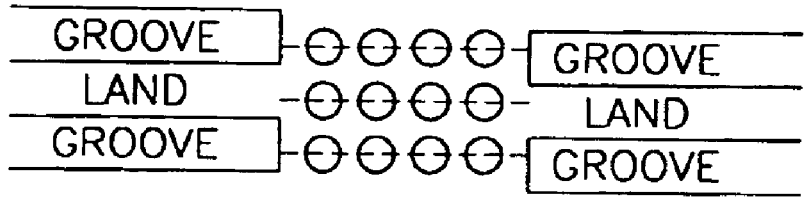
FIGS. 2A through 2D are diagrams showing the examples of a header area of a conventional optical disc.
Figure 2B:
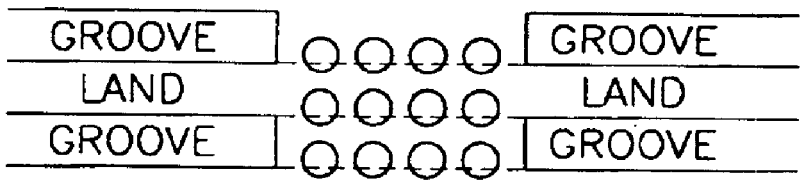
Figure 2C:
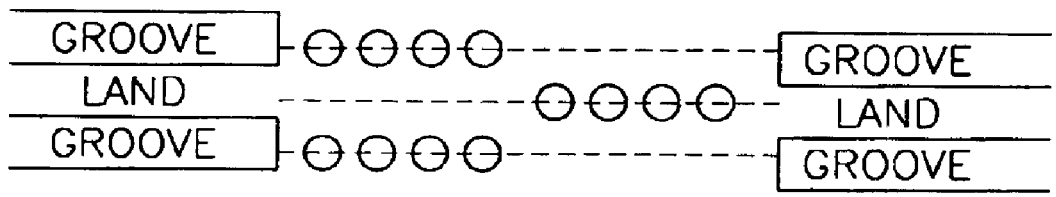
Figure 2D:
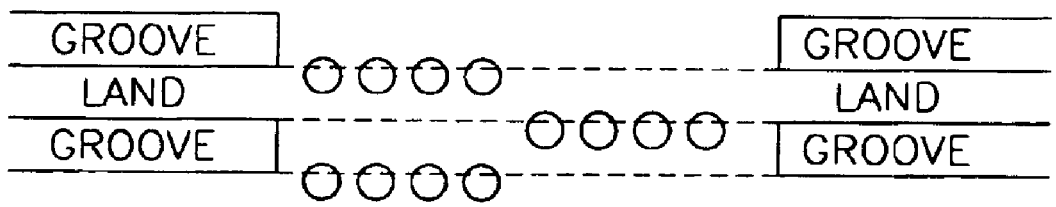
Figure 3A:
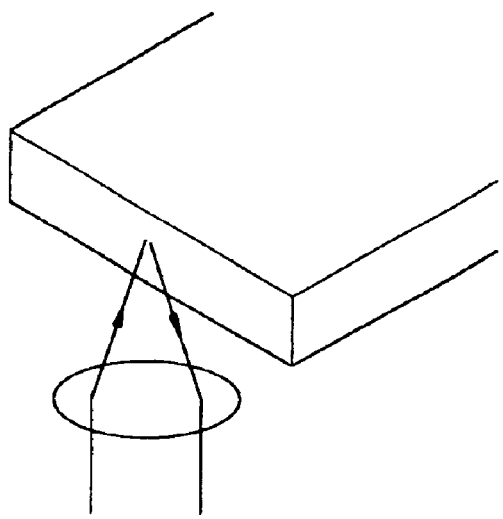
FIGS. 3A through 3D are diagrams showing the simulations and calculation of a decrease in the quantity of reflected light.
Figure 3B:
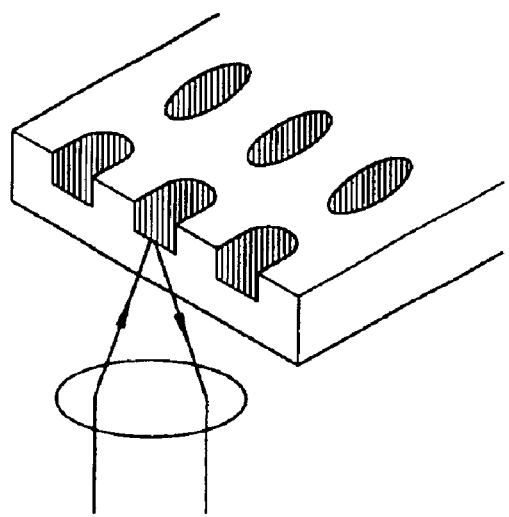
Figure 3C:
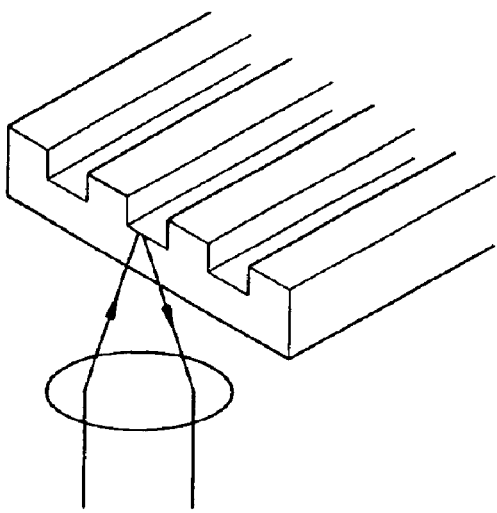
Figure 3D:
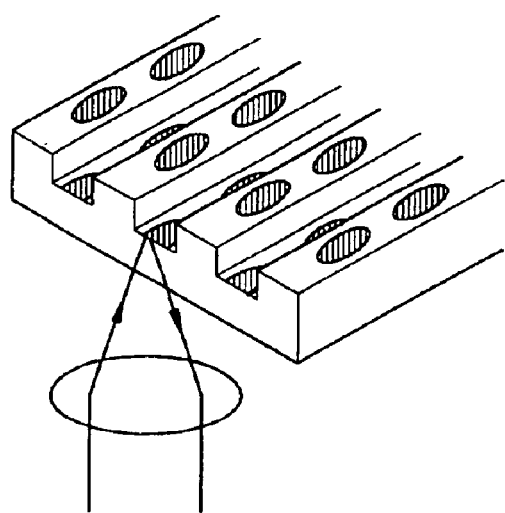
Figure 5:
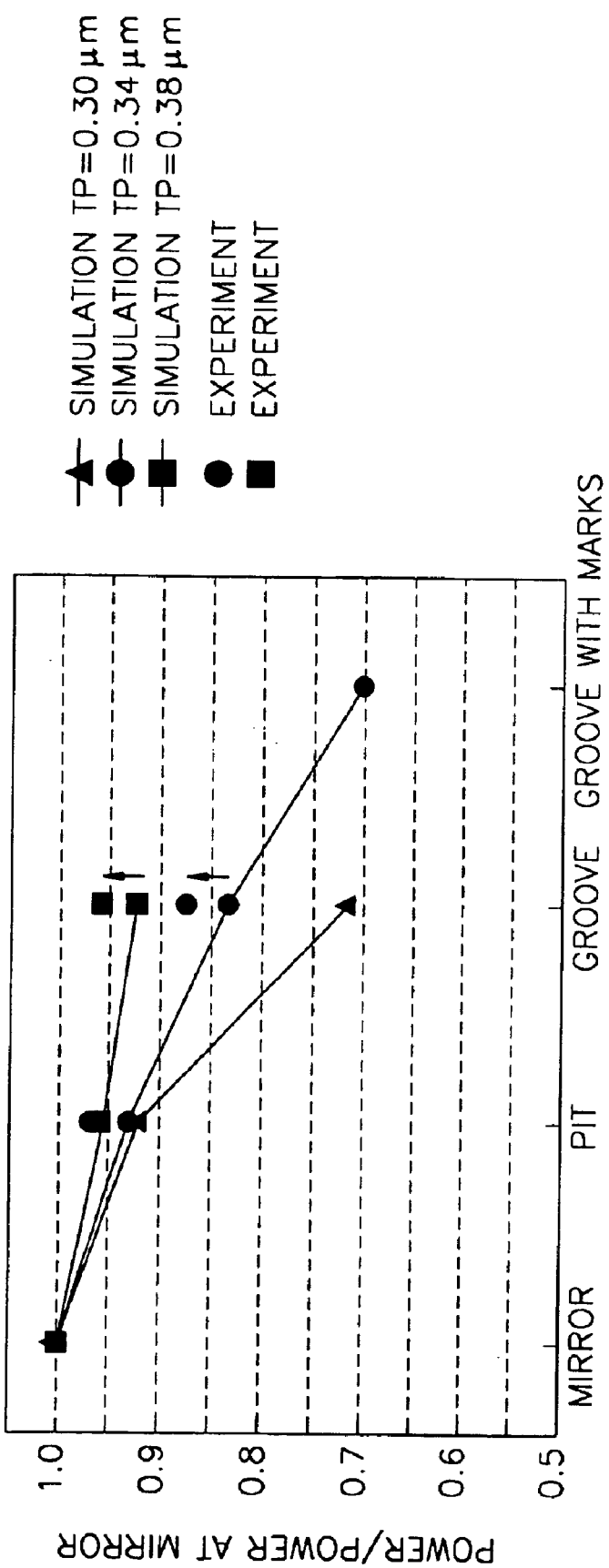
FIG. 5 is a graph showing the results obtained from FIGS. 3A through 4C.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 6:
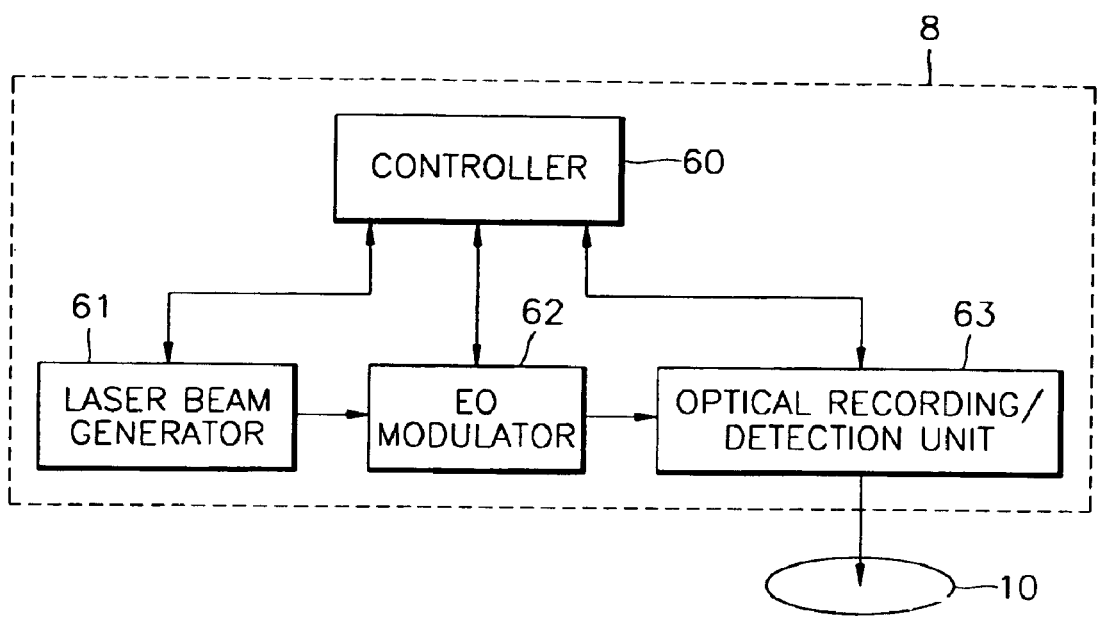
FIG. 6 is a block diagram of a recording apparatus according to the present invention.

FIG. 6 is a block diagram of a recording apparatus according to the present invention. Referring to FIG. 6, a recording apparatus 8 includes a controller 60 a laser beam generator 61, an electro-optical (EO) modulator 62, and an optical recording/detection unit 63.

The controller 60 appropriately controls the laser beam generator 61, the EO modulator 62 and the optical recording/detection unit 63 record user data formed of marks to a user data area or record header marks to a header area on an optical disc 10. In addition, the controller 60 checks a lead-in area or an area to which control information is recorded on the optical disc 10 to determine whether the header marks are recorded to the header area. When it is determined that the header marks are recorded, the controller 60 controls the optical recording/detection unit 63 to pass the header area with a predetermined passing power during the recording of the user data. When it is determined that the header marks are not recorded, the controller 60 controls the optical recording/detection unit 63 to record the header marks to a land or groove in the header area.

The laser beam generator 61 oscillates a laser beam and then reduces the noise of the oscillated laser beam to stabilize a recording power. For a recording laser beam, a blue laser beam or an ultraviolet laser beam can be used. Usually, an Ar ion laser or a Kr laser is used to generate the ultraviolet laser beam.

The EO modulator 62 modulates the passing power when necessary and enlarges the diameter of a laser beam so that laser beams can be fully incident on an objective lens (not shown) provided in the optical recording/detection unit 63. The optical recording/detection unit 63 records data to the optical disc 10 using the smallest width of the laser beam.

In addition, the optical recording/detection unit 63 detects a user data area or a header area. A header area can be detected by the optical recording/detection unit 63 according to a variety of methods. In one example, a phase modulated wobble signal is recorded to a predetermined portion on a wobbled track adjacent to a header area, and the phase modulated wobble signal is detected. In this method, the phase modulated wobble signal functions as a flag indicating a header area. The phase modulated wobble signal recorded to the header area may be a wobble signal modulated by binary-phase shift keying (BPSK). In another example, a mirror section to which a wobble signal is not recorded is formed at a predetermined portion on a wobbled track adjacent to a header area. It will be apparent that among the conventional methods used for detecting a header area, methods which can be applied to an optical recording medium according to the present invention can be used.

Figure 7:
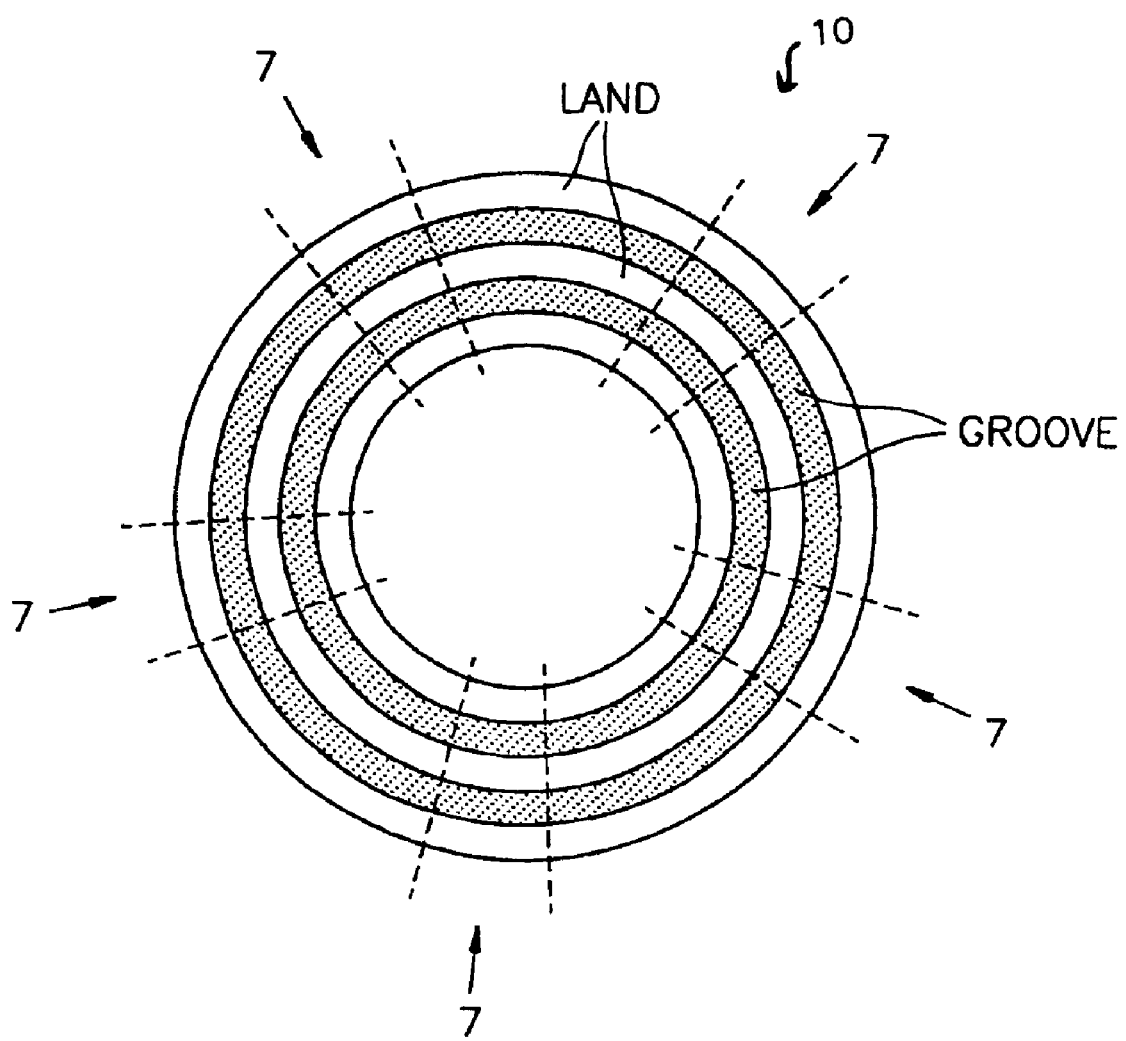
FIG. 7 is a schematic diagram of an optical disc according to the present invention.

FIG. 7 is a schematic diagram of the optical disc 10 according to the present invention. Referring to FIG. 7, a groove as a tracking means for exactly tracking a recording laser beam is formed along a track on the optical disc 10. Lands corresponding to the surface of a disc substrate exist between the grooves.

A wobble signal of a specific frequency is recorded to a groove track and/or a land track. The wobble signal is a means of recording an auxiliary clock signal for obtaining synchronizing information during recording or reproduction. Therefore, the wobble signal has a frequency band which does not influence a tracking servo mechanism provided for a recording/reproducing apparatus. User data is recorded to a groove track and/or a land track. All tracks are divided into a plurality of sectors for management.

Meanwhile, a header area 7 corresponding to each sector is disposed on each track. Header information is recorded to each header area 7. The header information includes sector information of an optical disc and address information which is information for identifying a sector.

Figure 8:
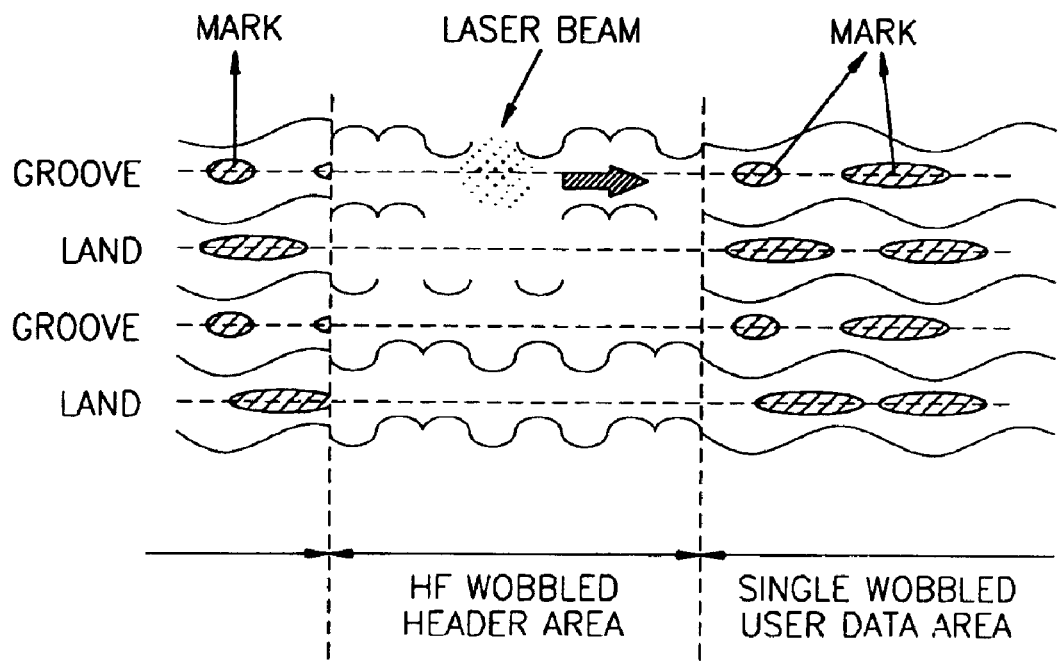
FIG. 8 is a detailed partial diagram of the optical disc shown in FIG. 7 according to a first embodiment of the present invention.

FIG. 8 is a detailed partial diagram of FIG. 7 according to a first embodiment. Referring to FIG. 8, a single wobble signal having a single frequency is recorded to each of the groove and land tracks. A phase transition layer allowing overwrite is formed on the groove and land tracks so that marks are formed through a change in a phase during the recording of user data. In a header area, a track is formed to be continued from the groove or land track of an adjacent user data area. A wobble header signal containing header information is recorded to the track in the header area. For a clearer description, a groove or land track in a user data area is referred to as a wobbled track, and a track in a header area is referred to as a wobbled header track.

A wobble header signal recorded to a wobbled header track contains various kinds of header information. Accordingly, the wobble header signal has a frequency higher than a wobble signal recorded to a wobbled track. Here, the wobble header signal is a bi-phase modulated signal. Specifically, the wobble header signal is a quadrature phase shift keying (QPSK) signal.

A header area on an optical recording medium according to the present invention is configured as a wobbled header track to which a wobble header signal is recorded so that its physical geometry is much more uniform than that of a conventional header area with pre-pits. Accordingly, a decrease in the quantity of reflected light, which has been described with reference to FIGS. 3A through 5, rarely occurs when user data is recorded to an upper layer in a dual layer structure.

Figure 9:
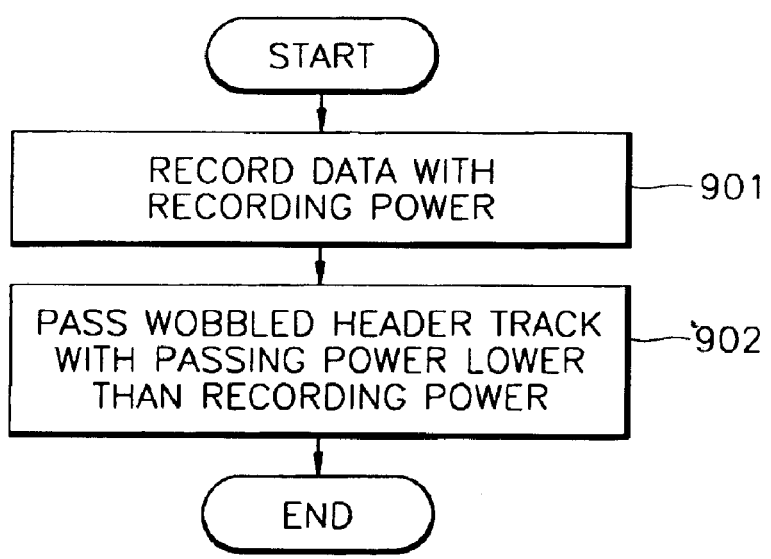
FIG. 9 is a flowchart of a data recording method according to the first embodiment of the present invention.

The following description concerns a data recording method according to the first embodiment of the present invention in a recording apparatus having such configuration as shown and described in FIG. 6 and above, respectively. FIG. 9 is a flowchart of a data recording method according to the first embodiment of the present invention. An optical recording medium to which data is recorded according to the present invention is the optical disc 10 described with references to FIGS. 7 and 8. Here, the data is user data that is recorded to a user data area of the optical recording medium.

Referring to FIGS. 6 and 9, the controller 60 controls the optical recording/detection unit 63 to record user data to a wobbled track in a user data area with a predetermined recording power in step 901. When a header area is detected by the optical recording/detection unit 63, the controller 60 controls the recording power to be lowered to a reproducing power so that the optical recording/detection unit 63 passes the header area with the reproducing power without recording the user data in step 902. In other words, the passing power is the same as the reproducing power. Here, the passing power may be selected from the various values lower than the value of the recording power.

Figure 10:
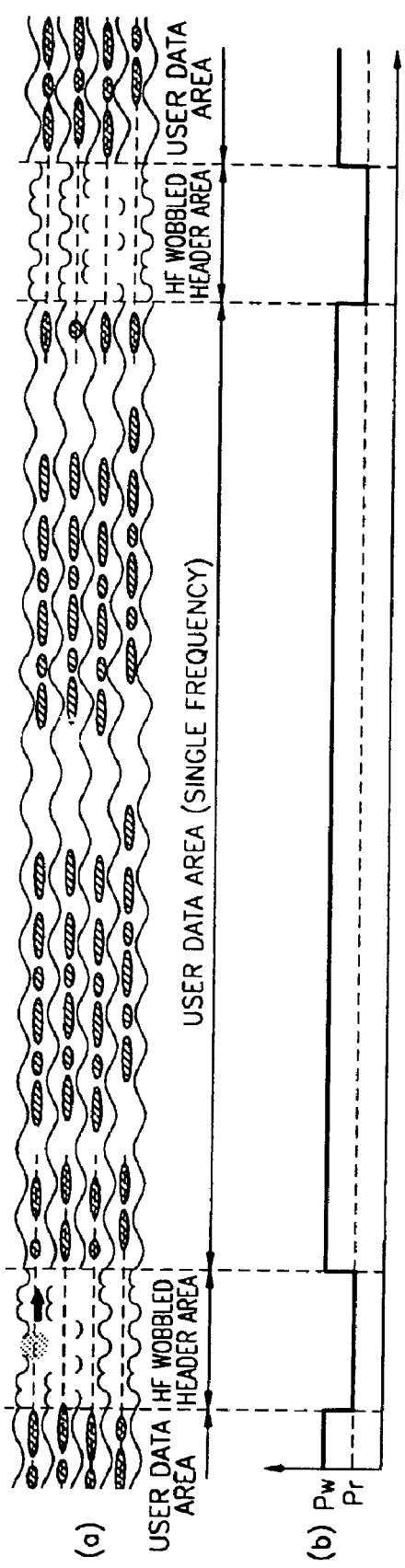
FIG. 10 is a diagram for explaining the relation between recording power and passing power in the data recording method of FIG. 9.

FIG. 10 is a diagram explaining the relation between the recording power and the passing power in the data recording method of FIG. 9. Referring to FIGS. 6 and 10, a single wobble signal of low frequency is recorded to a wobbled track formed in a user data area, and a wobble header signal of high frequency (HF) is recorded to a wobbled header track formed in a header area. The recording power Pw is output from the optical recording/detection unit 63 when the recording apparatus 8 records user data, that is, forms marks, on the user data area. The passing power Pr is output from the optical recording/detection unit 63 when the recording apparatus 8 passes the header area. The passing power Pr is the same as a reproducing power that is lower than the recording power Pw. As described above, since the recording power Pw is lowered to the reproducing power when a recording apparatus passes a header area to which a wobble header signal containing header information is recorded, phase transition does not occur on a wobbled header track in the header area even if recording is repeated. Therefore, degradation of the wobble header signal can be prevented. The recording power Pw may be changed to a passing power, which is lower than the recording power Pw by a predetermined value, and having a different value from the reproducing power. However, using the reproducing power facilitates control because the level of power can be controlled with just two modes, the recording power Pw and the reproducing power that is used as the passing power Pr, in a recording/reproducing apparatus.

Figure 11:
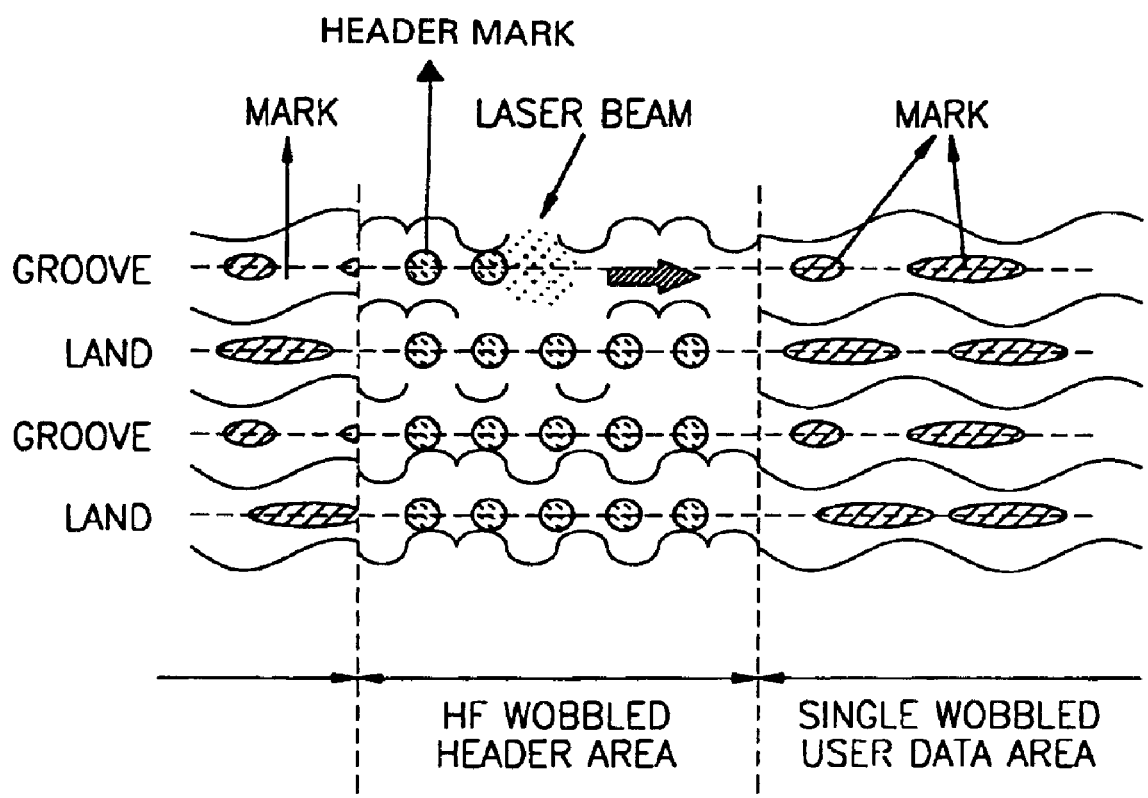
FIG. 11 is a detailed partial diagram of the optical disc shown in FIG. 7 according to a second embodiment of the present invention.

FIG. 11 is a detailed partial diagram of FIG. 7 according to a second embodiment. Referring to FIG. 11, a single wobble signal having a single frequency is recorded to each of the groove and land tracks. A phase transition layer allowing overwrite is formed on the groove and land tracks so that marks are formed through a change in a phase during recording of user data. In a header area, tracks are formed to be continued from the groove or land track of an adjacent user data area. A wobble header signal containing header information is recorded to the tracks in the header area. A wobble header signal recorded to a wobbled header track contains various kinds of header information. Accordingly, the wobble header signal has a frequency higher than a wobble signal recorded to a wobbled track. Here, the wobble header signal is a bi-phase modulated signal. Specifically, the wobble header signal is a QPSK signal.

In addition, header marks are recorded to the land or groove tracks in the header area. The header marks are formed by phase transition. When header marks having a uniform size are recorded to at least part of the tracks in the header area at regular intervals, the header marks can act as synchronization data informing the beginning of the following land or groove track in the user data area (wobbled track).

A header area on an optical recording medium according to the present invention includes wobbled header tracks to which a wobble header signal is recorded and to which header marks are recorded on the land or groove of the wobbled header track so that its physical geometry is similar to the physical geometry of a user data area. This provides a uniform physical geometry throughout the optical medium. Accordingly, a decrease in the quantity of light is reduced even when data is recorded to an upper layer in a dual layer structure.

Figure 12:
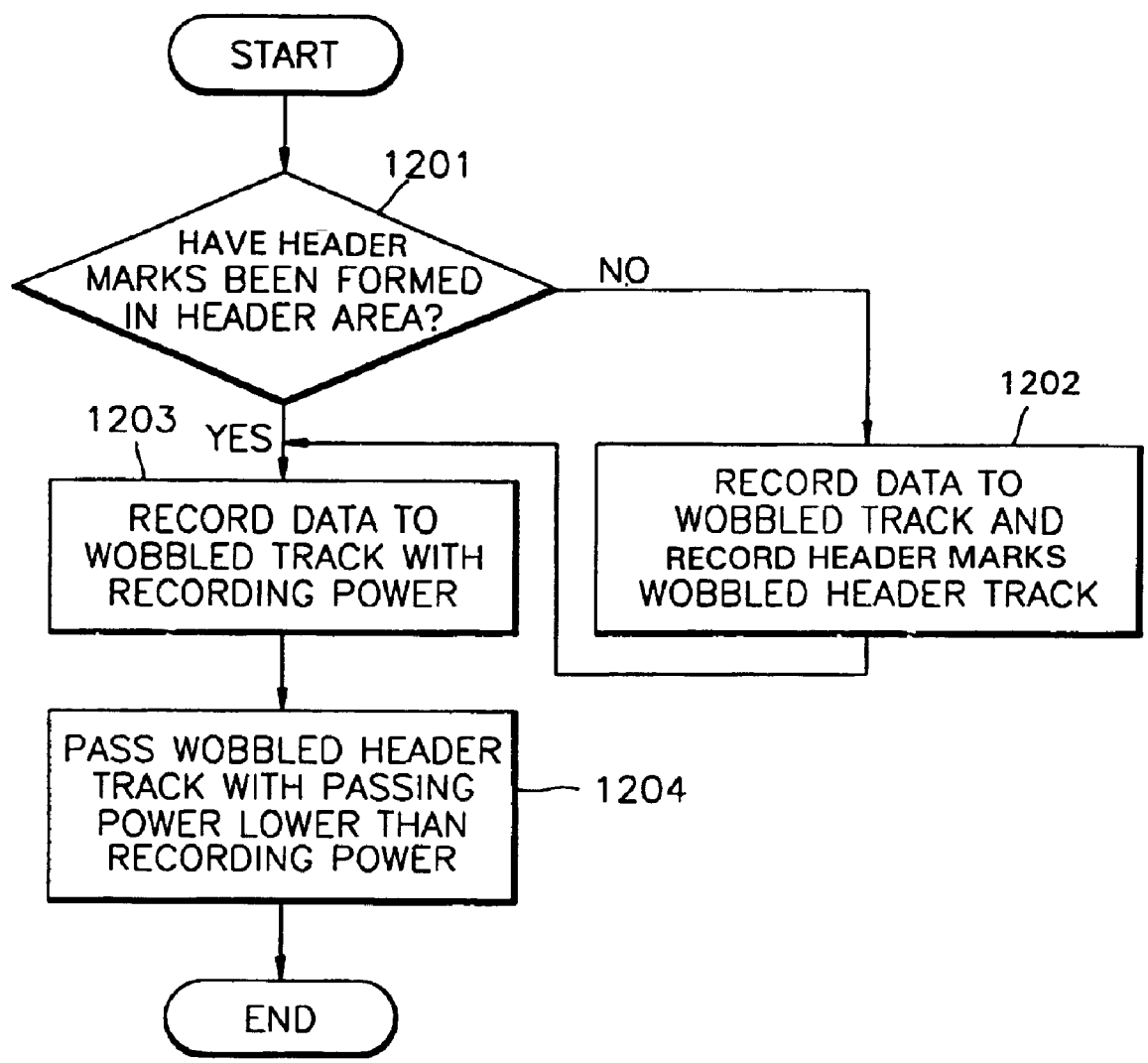
FIG. 12 is a flowchart of a data recording method according to the second embodiment of the present invention.

The following description concerns a data recording method according to the second embodiment of the present invention in a recording apparatus having configuration as shown and described in FIG. 6 and above, respectively. FIG. 12 is a flowchart of a data recording method according to the second embodiment of the present invention. Here, an optical recording medium to which data is recorded is the optical disc described with reference to FIG. 11. The optical disc may or may not have header marks in the beginning.

Referring to FIGS. 6 and 12, the controller 60 determines whether marks have been formed in a header area of the optical disc 10 in step 1201. Practically, information indicating whether the header marks have been formed in the header area can be recorded to a lead-in area or an area to which control information is recorded during an authoring process of the optical disc 10. Accordingly, the controller 60 can determine whether the header marks have been formed.

When it is determined that the header marks have not been formed in the header area, the controller 60 controls the optical recording/detection unit 63 to record user data to a wobbled track and record header marks to a wobbled header track, respectively, with a predetermined recording power in step 1202.

When it is determined that the marks have been formed in the header area, the controller 60 controls the optical recording/detection unit 63 to record user data to the wobbled track with the predetermined recording power in step 1203. In addition, when the header area is detected, the controller 60 controls the optical recording/detection unit 63 to lower the recording power to a reproducing power so that the optical recording/detection unit 63 does not record data but passes the header area, that is, the wobbled header track, with the reproducing power in step 1204. Here, the passing power is the same as the reproducing power. The value of the passing power can be selected from various values lower than the value of the recording power.

Figure 13:
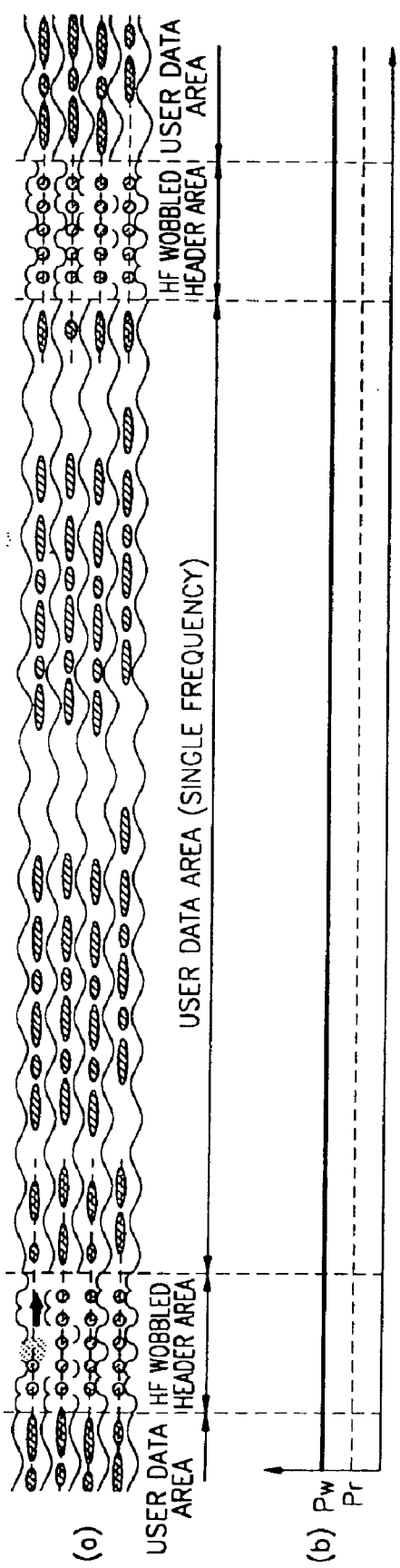
FIGS. 13 and 14 are diagrams for explaining the relation between recording power and passing power in the data recording method of FIG. 12.
Figure 14:
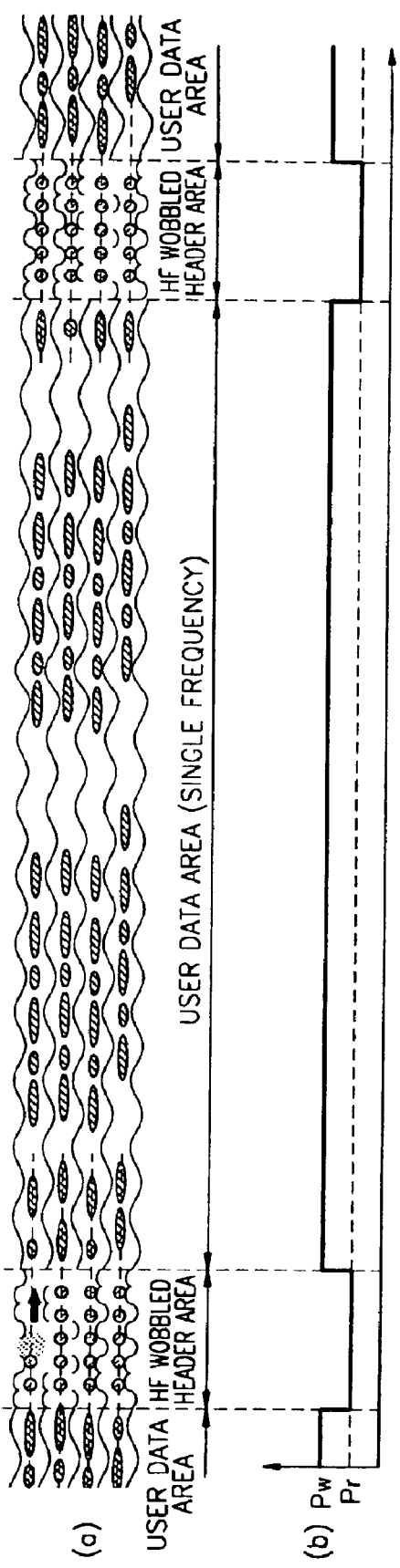

FIGS. 13 and 14 are diagrams explaining the relation between the recording power and the passing power in the data recording method of FIG. 12. Referring to FIG. 13, a single wobble signal of low frequency is recorded to a wobbled track in a user data area, and a wobble header signal of high frequency (HF) is recorded to a wobbled header track in a header area. In addition, header marks are formed on a land or groove of the wobbled header track.

When recording data for the first time to the optical disc 10 in which header marks are not formed on a wobbled header track (for example, when formatting the optical disc), the recording apparatus 8 records user data to a wobbled track or the header marks to the wobbled header track through a phase transition. Accordingly, recording power Pw is outputted from the optical recording/detection unit 63 when the user data or the header marks are recorded to a user data area or a header area, respectively.

Referring to FIG. 14, when header marks are already formed on a wobbled header track, passing power Pr output from the optical recording/detection unit 63 when the recording apparatus 8 passes a header area is the same as a reproducing power, which is lower than the recording power Pw. Therefore, a phase transition does not occur on the wobbled header track and degradation of a wobble header signal can be prevented. In addition, using the reproducing power as the passing power facilitates control as the level of power can be controlled with just two modes, the recording power Pw and the reproducing power that is used as the passing power Pr.

As described above, according to the present invention, the physical geometry of a header area is uniform so that the quantity of light reflected from an optical recording medium does not decrease during recording. In addition, since the recording power is lowered to a reproducing power in the header area during recording, degradation of the header area can be prevented.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A method of recording data to a recording medium which comprises a wobbled track to which a wobble signal is recorded, and a wobbled header track to which a wobble header signal having header information and predetermined header marks are recorded, the method comprising:
   recording user data to the wobbled track;
   determining whether the header marks have been formed; and
   recording the header marks to a land or a groove of the wobbled header track with a predetermined power if the header marks have not been formed, otherwise passing the wobbled header track.

2. The method of claim 1, wherein the recording of the header marks comprises forming the header marks to at least part of the wobbled header track at regular intervals.

3. The method of claim 2, wherein the recording of the header marks further comprises forming the header marks having a predetermined size to the at least part of the wobbled header track at regular intervals.

4. The method of claim 1, wherein:
   the recording of the user data comprises recording the user data to the wobbled track with a recording power, and
   the passing of the wobbled header track comprises passing the wobbled header track with a passing power that is lower than the recording power by a predetermined level if the header marks have been formed.

5. The method of claim 4, wherein the passing power is the same as a reproducing power so that a phase transition does not occur to the wobbled header track.

6. An apparatus for recording data to a recording medium which comprises a wobbled track to which a wobble signal is recorded, and a wobbled header track to which a wobble header signal having header information and predetermined header marks are recorded, the apparatus comprising:
   a recording unit which records user data to the wobbled track and records the header marks as the wobble header signal to the wobbled header track if the header marks have not been formed, otherwise the recording unit records the user data and detects and passes the wobbled header track; and
   a controller which determines whether the header marks have been formed, and controls the recording unit to record the user data to the wobbled track and record the header marks to a land or a groove of the wobbled header track, otherwise controls the recording unit to record the user data to the wobbled track and pass the wobbled header track.

7. The apparatus of claim 6, wherein the controller controls the recording unit to form the header marks to at least part of the wobbled header track at regular intervals.

8. The apparatus of claim 7, wherein the controller controls the recording unit to form the header marks having a predetermined size to at least part of the wobbled header track at regular intervals.

9. The apparatus of claim 6, wherein the controller controls the recording unit to record the user data to the wobbled track with a recording power and pass the wobbled header track with a passing power that is lower than the recording power by a predetermined level if the header marks have been formed.

10. The apparatus of claim 6, wherein the controller controls the recording unit to pass the wobbled header track, if the header marks have not been formed, with the passing power that is same as a reproducing power so that a phase transition does not occur to the wobbled header track.

11. The apparatus of claim 6, wherein the recording unit comprises:
- a laser beam generator which generates a laser beam;
- an electro-optical modulator which modulates the laser beam generated from the laser beam generator into an optical signal; and
- an optical recorder which records the user data or the header marks using the optical signal output from the electro-optical modulator.

* * * * *